July 28, 1936.  M. A. WECKERLY  2,049,283
PHOTOELECTRIC DEVICE
Filed May 31, 1934   2 Sheets-Sheet 1
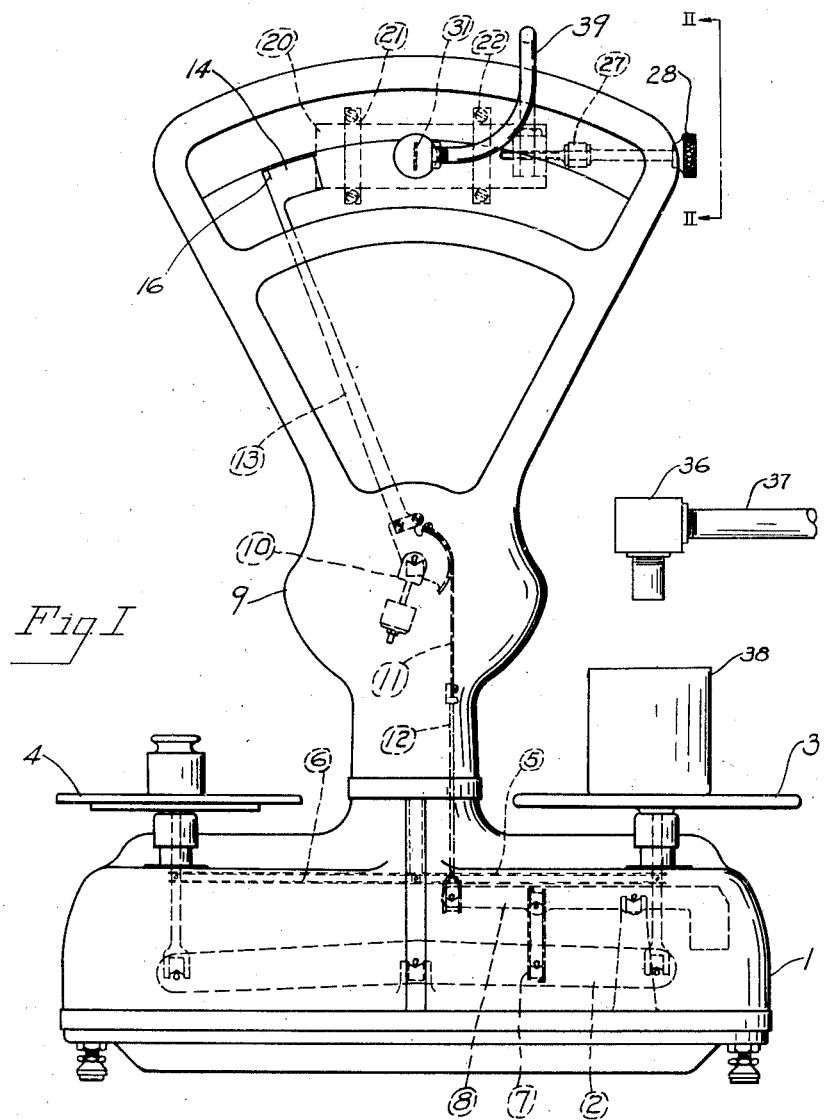
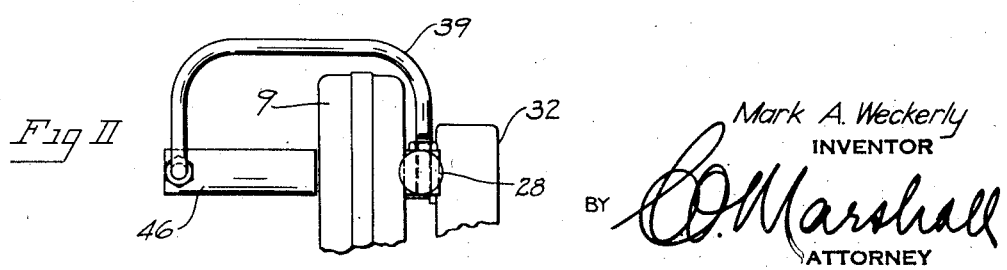
Mark A. Weckerly
INVENTOR
BY C. O. Marshall
ATTORNEY

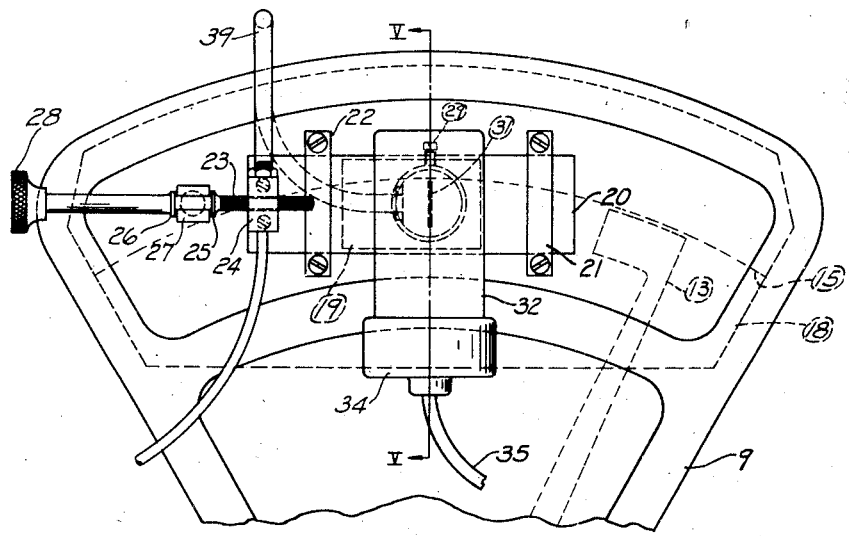
Fig. III
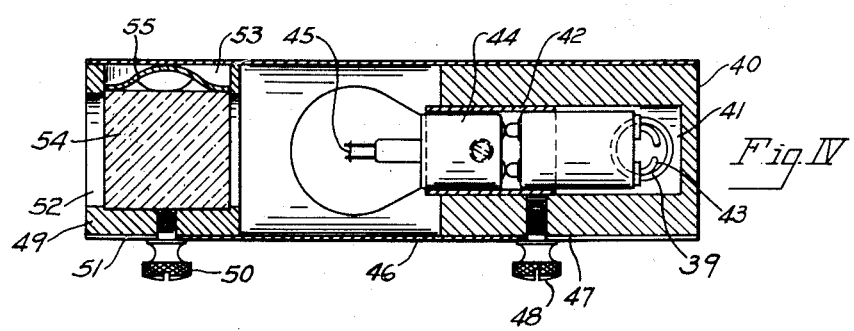
Fig. IV
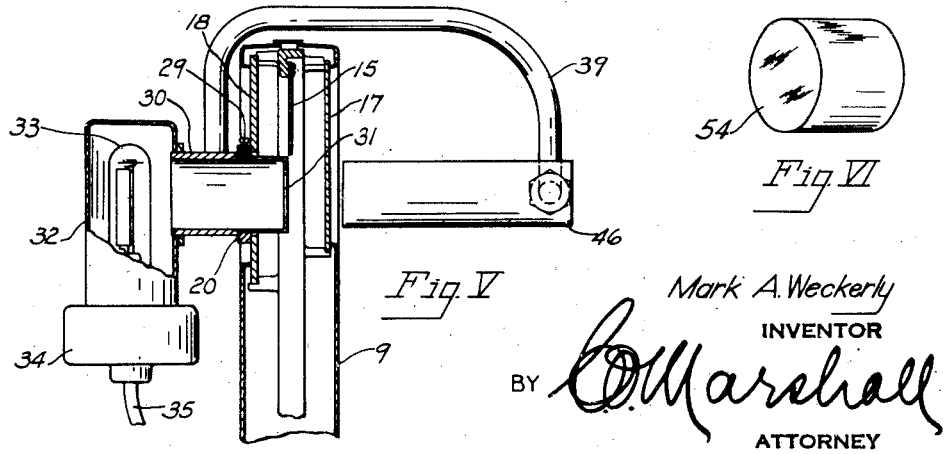
Fig. V
Fig. VI
Mark A. Weckerly
INVENTOR Patented July 28, 1936

2,049,283

UNITED STATES PATENT OFFICE 2,049,283

PHOTOELECTRIC DEVICE

Mark A. Weckerly, Toledo, Ohio, assignor to Toledo Scale Manufacturing Company, Toledo, Ohio, a corporation of New Jersey Application May 31, 1934, Serial No. 728,380

2 Claims. (Cl. 250—41.5)

This invention relates to photoelectric devices, and particularly to photoelectric attachments for weighing scales and other instruments, and one of its principal objects is to provide a device in which great variations in the amounts of light falling upon a photoelectric element are affected by small movements of an eclipsing element, such, for example, as a blade, the movement of which is controlled by a weighing scale.

Another object of the invention is to provide means for easy and accurate positional adjustment of a photoelectric element and an illuminating element therefor.

And a further object of the invention is to provide an efficacious photoelectric control device of simple and economical construction embodying readily replaceable photoelectric and illuminating elements of standard construction.

Other objects and advantages will be apparent from the following description, in which reference is had to the accompanying drawings wherein similar reference numerals apply to similar parts throughout the several views.

In the drawings:—

Figure I is a front elevational view of a weighing scale equipped with a photoelectric feed control device embodying my invention;

Figure II is a fragmentary side elevational view from the position indicated by the line II—II of Figure I;

Figure III is an enlarged fragmentary back elevational view showing the means by which the device of my invention is attached to a weighing scale;

Figure IV is a further enlarged, vertical sectional view showing the illuminating element and its mounting in detail;

Figure V is an elevational view, partly in section, along the line V—V of Figure III; and Figure VI is a perspective view showing the lens which forms a part of the device.

Referring to the drawings in detail, the device is illustrated in combination with a weighing scale having a base housing 1 within which is fulcrumed an even arm lever 2 which supports at one end a commodity platter 3 and at the other end a weight pan 4, the commodity platter and weight pan being kept horizontal during rocking movements of the lever 2 by means of check links 5 and 6. Movement of the even arm lever 2 is transmitted through a link 7 to a transmission lever 8.

Supported centrally above the base housing 1 is an upright housing 9 within which is fulcrumed a load-counterbalancing pendulum 10, the pendulum 10 being connected by means of a flexible metallic ribbon 11 and pull rod 12 to the nose of the transmission lever 8. Fixed to the pendulum 10 and swingable therewith is a hand 13, the upper end of which carries a blade 14. An arcuate chart 15 is fixed within the upright housing 9 with its front surface lying in substantially the same plane with the front surface of the blade 14 and the chart 15 may be provided with indicia (not shown) adapted to cooperate with an index mark 16 on the blade 14, the chart and index being visible through a transparent window 17 in the front of the upright housing 9.

Fixed within the upright housing 9 at the rear of the chart 15 and closing an opening in the rear of the housing is a metallic plate 18. The plate 18 is provided with a rectangular opening 19 which in turn is covered by a slide 20 that is mounted for lateral movement by means of a pair of guide straps 21 and 22, the ends of which are secured to the plate 18. The slide 20 is adjustable laterally and held in adjusted position by means of a threaded shaft 23 which is threaded through a block 24 fixed to the slide 20 and is provided with shoulders 25 and 26 positioned on opposite sides of a grooved block 27 which is mounted upon the plate 18. A knurled knob 28 is fixed to the outer end of the shaft 23 to facilitate turning it for the purpose of adjusting the position of the slide 20.

Fitted within an opening in the slide 20 and held against movement therein by means of a set screw 29 is a tubular member 30, one end of which lies closely behind the path of movement of the blade 14 and is closed except for a narrow vertical slot 31. The other end of the tubular member 30 opens into and supports a casing 32 which contains a photoelectric tube 33, the photoelectric tube being supported by a mounting 34 detachably connected to the lower end of the casing 32. The photoelectric tube is connected through a cable 35, in a manner well known in the art, to an electrically operated valve 36 which is connected by means of a pipe 37 to a supply of fluid (not shown) and is adapted to control the passage of fluid into a container 38 mounted on the scale platform 3. Fixed to the block 24 is one end of a bent pipe 39 which constitutes a supporting bracket for an illuminating device and also a conduit for current carrying wires leading to the illuminating device.

The illuminating device, which is supported by the bent pipe 39 directly in front of the tubular member 30, is assembled upon a cylindrical support 40 which is fixed to the end of the bent pipe 39 and is provided with a central bore 41 into which the end of the pipe 39 opens. Mounted within the bore 41 is a commercially available lamp socket 42 (of a type now commonly used in automobile headlights) from which current carrying wires 43 pass through the pipe 39 to a source of current (not shown). The socket 42 receives a lamp 44 (also of the type now commonly used in automobile headlights) which has a filament consisting of a fine coil 45. The socket 42 is so positioned in the bore 41 that the axis of the filament coil 45 is substantially vertical.

Fitting over the cylindrical support 40 is a sleeve 46 which encloses the lamp 44 and extends towards the tubular member 30. The end of the sleeve 46 which fits over the cylindrical support 40 is slotted, as at 47, to pass a knurled retaining screw 48 which is threaded into the cylindrical support 40 and which when turned holds the sleeve 46 in adjusted position. Fitted into the end of the sleeve 46 nearest the tubular member 30 is a plug 49, also provided with a retaining screw 50 which passes through the slot 51 in the sleeve 46 and is threaded into the plug 49 to hold the plug in adjusted position. The plug 49 has a bore 52 co-axial with the sleeve 46 and a bore 53 of somewhat larger diameter than the bore 52, the axis of the bore 53 intersecting the axis of the bore 52 at right angles. Fitted within the bore 53 and extending entirely across the bore 52 is a cylindrical lens 54 (see Figures IV and VI) which when the plug 49 is pushed into the sleeve 46 is held in place by a spring retainer 55.

When the photoelectric device is assembled the axis of the filament coil 45 and the axis of the cylindrical lens 54 and the slot 31 in the tubular member 30 are parallel and the parts are so positioned and adjusted that light from the filament 45 is focused along a line immediately in front of the slot 31 and falls upon a substantial area of the light sensitive surface within the photoelectric tube 33, maximum illuminating effect thus being obtained despite the narrowness of the slot 31.

In the operation of the device the commodity is fed through the open valve 36 into the container 38 until the weight of the commodity, acting through the scale mechanism, causes the advance edge of the blade 14 to intercept the thin but brilliant beam of light passing through the slot 31, thus preventing the beam from reaching the photoelectric tube. By a known system of electrical connections and relays (not shown) the valve 36 is wholly or partially closed. When the trailing edge of the blade 14 passes the slot 31 the entire beam is instantly readmitted to the photoelectric tube and the resulting pronounced change in impedance may be utilized to actuate circuits and relays to complete the closing of the valve 36 or to accomplish other desired results.

By turning the knurled knob 28 the position of the photoelectric assembly may be shifted so that light will be cut off and/or admitted to the photoelectric tube sooner or later in the swing of the pendulum 10, the hand 13 and blade 14.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a measuring instrument, means movable by said measuring instrument responsive to changes in the quantity to be measured, a photoelectric device including a light sensitive element, a source of light and means for transmitting a concentrated ray of light from said source to said light sensitive element, means for mounting said photoelectric device so that light passing from said source to said ray of light sensitive element crosses the path of movement of said movable means, and means for adjusting the position of said photoelectric device to vary the point at which said path is crossed by said light, and means for simultaneously adjusting the position of said source of light and said means for transmitting light, whereby the amount of light transmitted from said source of light to said light-sensitive element is maintained unchanged in the several positions of adjustment of said light-sensitive element.

2. In a device of the class described, in combination, a measuring instrument, said measuring instrument having a movable member and means whereby said movable member is positioned according to the quantity measured by said instrument, a photoelectric device including means for projecting a ray of light, light sensitive means positioned to be affected by said ray of light, means for mounting said photoelectric device so that said ray of light will be intercepted by said movable member, and means for adjusting said photoelectric device to vary the point of interception of said ray of light in the movement of said movable member, and means for simultaneously adjusting the position of said source of light and said means for transmitting light, whereby the amount of light transmitted from said source of light to said light-sensitive element is maintained unchanged in the several positions of adjustment of said light-sensitive element.

MARK A. WECKERLY.